US008839552B1

(12) United States Patent
Hudson

(10) Patent No.: US 8,839,552 B1
(45) Date of Patent: Sep. 23, 2014

(54) RAISED GARDEN BED SYSTEM INCLUDING SPRINKLER SYSTEM, AND THE LIKE

(75) Inventor: Michelle Hudson, Hattiesburg, MS (US)

(73) Assignee: Glory Gardens, LLC, Hattiesburg, MS (US)

(*) Notice: Subject to any disclaimer, the term of this patent is extended or adjusted under 35 U.S.C. 154(b) by 545 days.

(21) Appl. No.: 13/241,808

(22) Filed: Sep. 23, 2011

(51) Int. Cl.
*A01G 1/00* (2006.01)

(52) U.S. Cl.
USPC .............................................. 47/33

(58) Field of Classification Search
CPC ........... A01G 9/02; A01G 9/025; A01G 1/00; A01G 1/007
USPC ...................... 47/33, 65.9, 79, 66.1
See application file for complete search history.

(56) References Cited

U.S. PATENT DOCUMENTS

| | | | |
|---|---|---|---|
| 7,726,071 B2 * | 6/2010 | Carpenter | 47/65.9 |
| 8,479,443 B2 * | 7/2013 | Buist | 47/65.9 |
| 8,555,545 B2 * | 10/2013 | Fischer et al. | 47/65.9 |
| 2007/0094927 A1 * | 5/2007 | Perry | 47/65.9 |
| 2009/0183429 A1 * | 7/2009 | Kim et al. | 47/66.1 |
| 2010/0307056 A1 * | 12/2010 | Byles | 47/65.7 |
| 2011/0030274 A1 * | 2/2011 | Buist | 47/65.6 |

* cited by examiner

*Primary Examiner* — Monica Williams
(74) *Attorney, Agent, or Firm* — Shlesinger Arkwright & Garvey, LLP.

(57) ABSTRACT

Gardening system includes a raised garden bed, the raised garden bed including a garden box having a soil retaining area for plantings. Garden box includes side walls detachably attached together at adjacent free ends forming a corner. A weed barrier provided which extends between the front, back, left, and right side walls of the garden box, and is located at a lower portion of garden box below the soil-retaining area, and weed barrier extends up the side walls up to the height of the side walls. A sprinkler system with sprinklers is provided and can be coupled to a garden hose. Rods are provided having a length the same as the height of the side walls, for holding the garden box together and so that the garden system can be placed on a non-soil surface, such as a deck or the gardener's roof.

9 Claims, 4 Drawing Sheets

RAISED GARDEN BED SYSTEM INCLUDING SPRINKLER SYSTEM, AND THE LIKE

FIELD OF THE INVENTION

The invention relates to a raised garden bed system. More particularly, the invention relates to a raised garden bed system including a watering system. Even more particularly, the invention relates to a raised garden bed system made of synthetic materials, and which can be substantially assembled without the use tools, and which includes a sprinkler system.

BACKGROUND OF THE INVENTION

Raised garden beds are known, such as wooden garden beds made of pieces of wood nailed together. There are likewise known raised garden beds made of treated lumber that have an increased useful life as compared to untreated wooden raised garden beds.

There are likewise known raised garden beds that are made of synthetic materials, such as plastic side walls.

One known garden bed includes four plastic sides that are secured together by an elongated stake which has a length greater than the height of the sides of the raised garden bed. That stake extends through the corners of the plastic walls of the raised garden bed, past the bottom of the garden bed, and is inserted into the ground in order to prevent that known garden bed from moving, such as when struck sideways, in use.

There is likewise a known raised garden bed having four plastic sides, and which sides are held together by a tongue-and-groove connector at each corner. That is, one of the walls at each corner has a triangular male fastener, and the tongue-and-groove fastener on an adjacent side wall of that known plastic raised garden bed is a triangular female fastener which mates with the adjacent triangular male fastener.

There are many drawbacks of the prior art devices.

OBJECTS AND SUMMARY OF THE INVENTION

It is an object of the invention to overcome the drawbacks of the prior art.

It is a further object of the invention to provide a raised garden bed system which is environmentally friendly, easy to assemble, may be provided as an all-in-one system, may be assembled substantially without tools, and which may be disassembled and shipped in a substantially flat, compact manner, such as in one box.

It is a further object of the invention to provide a raised garden bed system including a watering system which is particularly suited for a suburban and urban lifestyle; that is, for use in limited spaces, on relatively hard surfaces, such as patios, on pervious and impervious surfaces such as brick and concrete patios, and on rooftop gardens, for example.

It is another object of the invention to provide a raised garden bed system including a watering system that can be assembled without the use of tools, is sufficiently strong to support large volumes of gardening soil, is sufficiently strong to resist the bending and breaking of side walls of the raised garden owing to the relatively large volume of dirt enclosed, and the relatively large torsional, bending, and breaking forces applied to the side walls of the raised garden, and which may be provided with any additional devices suitable for use with the raised garden bed, such as trellises, watering systems, and additional gardening tools and fixtures.

These and other objects have been achieved by the invention as set forth herein.

In sum, the invention is directed to a gardening system one of which comprises, includes, consists of, and consists essentially of a raised garden bed, the raised garden bed including a garden box having a soil retaining area for plantings. The garden box includes side walls detachably attached together at adjacent free ends forming a corner. A weed barrier is provided which extends between the front, back, left, and right side walls of the garden box, and is located at a lower portion of garden box below the soil-retaining area, and weed barrier extends up the side walls up to the height of the side walls. A sprinkler system with sprinklers is provided and can be coupled to a garden hose. One or more rods are provided having a length the same as the height of the side walls, for holding the garden box together and so that the garden system can be placed on a non-soil surface, such as a deck or a user's roof.

The invention is likewise directed to a gardening system, including:

a) A raised garden bed, the raised garden bed including:
   i) a garden box, the garden box defining a soil retaining area inside the box, and the garden box including a front, back, left, and right side wall, each side wall having two free ends, each free end having an attachment configured for being detachably attached to an attachment on the adjacent free end of an adjacent one of the respective front, back, left, and right side walls;
   ii) each attachment being configured for being detachably attached to another attachment without tools;
   iii) each free end including a hole configured for aligning with a respective hole on an adjacent free end of an adjacent side wall;
   iv) each side wall including an aperture therein for receiving a waterline therethrough;
   v) a weed barrier being provided, the weed barrier being configured for extending between the front, back, left, and right side walls of the garden box, and the weed barrier being located at a lower portion of the garden box below the soil-retaining area, the weed barrier being substantially pervious to water and impervious to plants, and the weed barrier being secured and configured for extending along the respective front, back, left, and right side walls between the soil retaining area and inside of the respective side walls, the weed barrier including side walls extending substantially as high as the height of the front, back, left, and right side walls;
   vi) a sprinkler system provided on the raised garden bed, the sprinkler system including a water line extending through one of the respective apertures provided in each one of the front, back, left, and right side wall;
   vii) a coupling provided on the water line, the coupling being configured for connecting to a garden hose;
   viii) a plurality of sprinklers provided on the water line, the plurality of sprinklers being spaced apart sufficiently for directing a water spray onto a respective portion of the soil retaining area of the garden box, the plurality of sprinklers collectively directing a collective water spray over substantially the entire soil retaining area.
   ix) a tool pocket provided on at least one of the side walls of the garden bed, the tool pocket being detachably attached to the side wall without the use of tools, and the tool pocket including a water drain hole in a lower portion thereof;

x) the attachment on the free end of each side wall including a hole; and xi) at least one rod being provided, each one of the at least one rod being configured for extending through the aligned respective holes aligned at the adjacent free ends of the adjacent side walls, the at least one rod having a length substantially the same as the height of the side walls, and the respective one of the at least one rod being detachably attached and secured in the respective holes without the use of tools for restricting movement of the respective holes and respective side walls for retaining each of the free ends in position for maintaining the raised garden bed in a desired configuration defining the garden box soil retaining area.

The gardening system likewise includes that the at least one rod includes four rods.

The gardening system likewise includes that the plurality of sprinklers includes at least six sprinklers.

The gardening system likewise includes that the plurality of sprinklers includes at least nine sprinklers.

The gardening system likewise includes that a plurality of spaced apart notches is provided in an upper portion of each of the respective side walls of the garden box, each of the notches in the upper portion is configured for receiving a part of a trellis therein, and at least one trellis is provided and detachably secured in respective spaced opposed notches in the upper portion of the spaced opposed side walls.

The gardening system likewise includes the use of the gardening system on a hard surface, such as a roof, a patio, and a deck.

Relative terms, such as up, down, left, and right are for convenience only and should not be interpreted as being limiting.

DETAILED DESCRIPTION OF THE INVENTION

Figure 1:
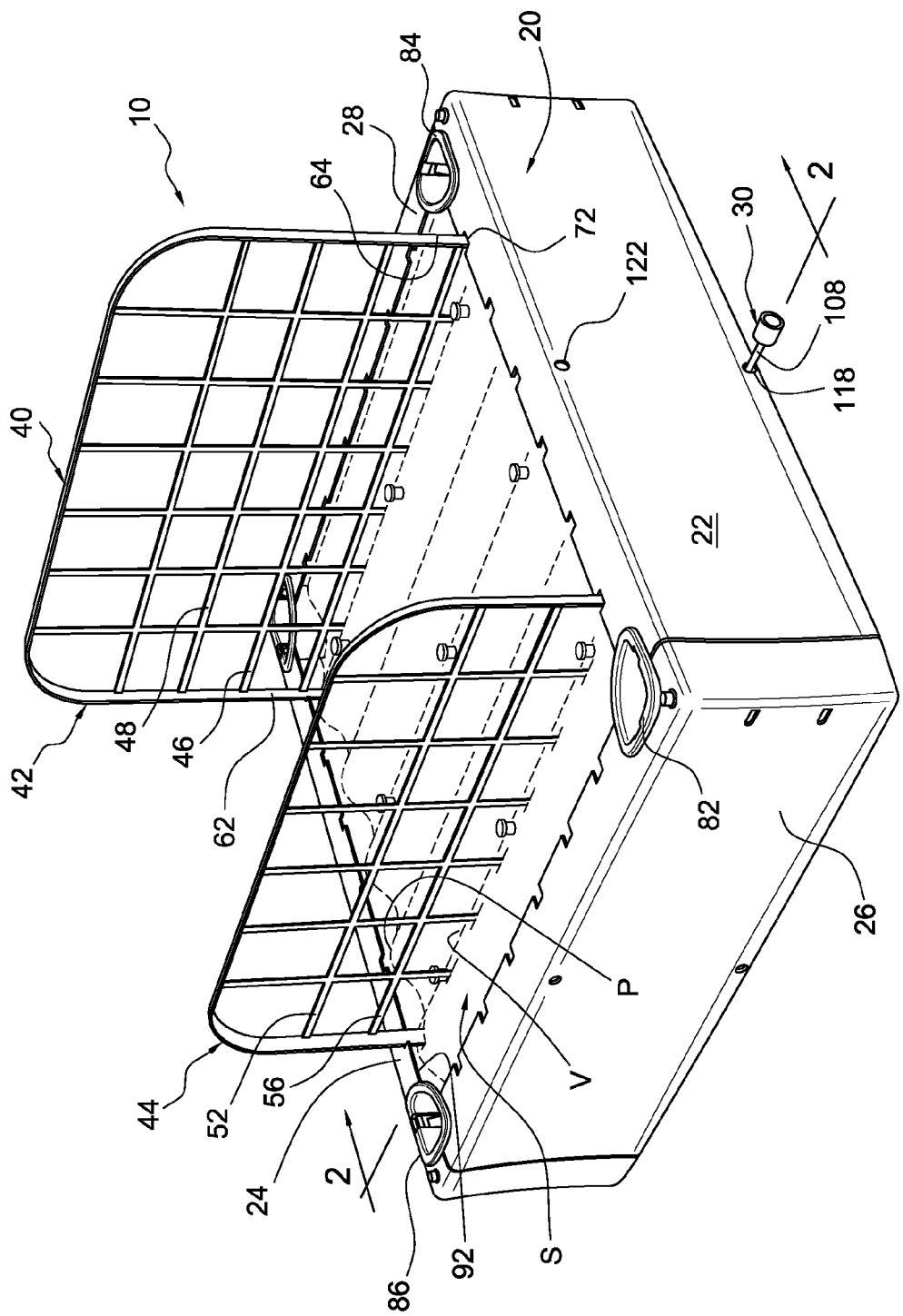
FIG. 1 is a top front perspective view of a raised garden bed system including a watering system, in accordance with an embodiment of the invention.
Figure 2:
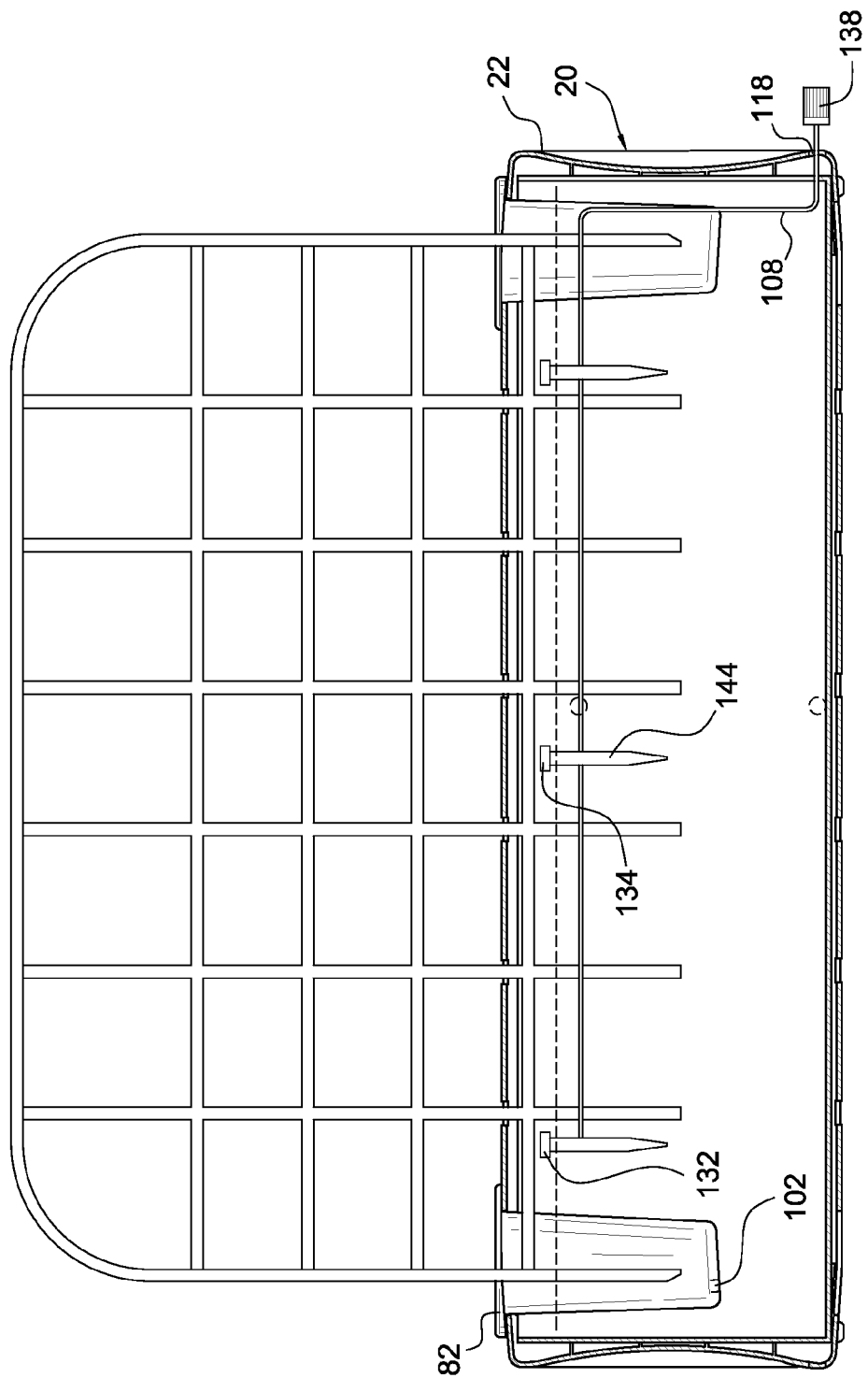
FIG. 2 is a cross sectional side view taken along line 2-2 of the embodiment of the raised garden bed system of FIG. 1 according to the invention.
Figure 3:
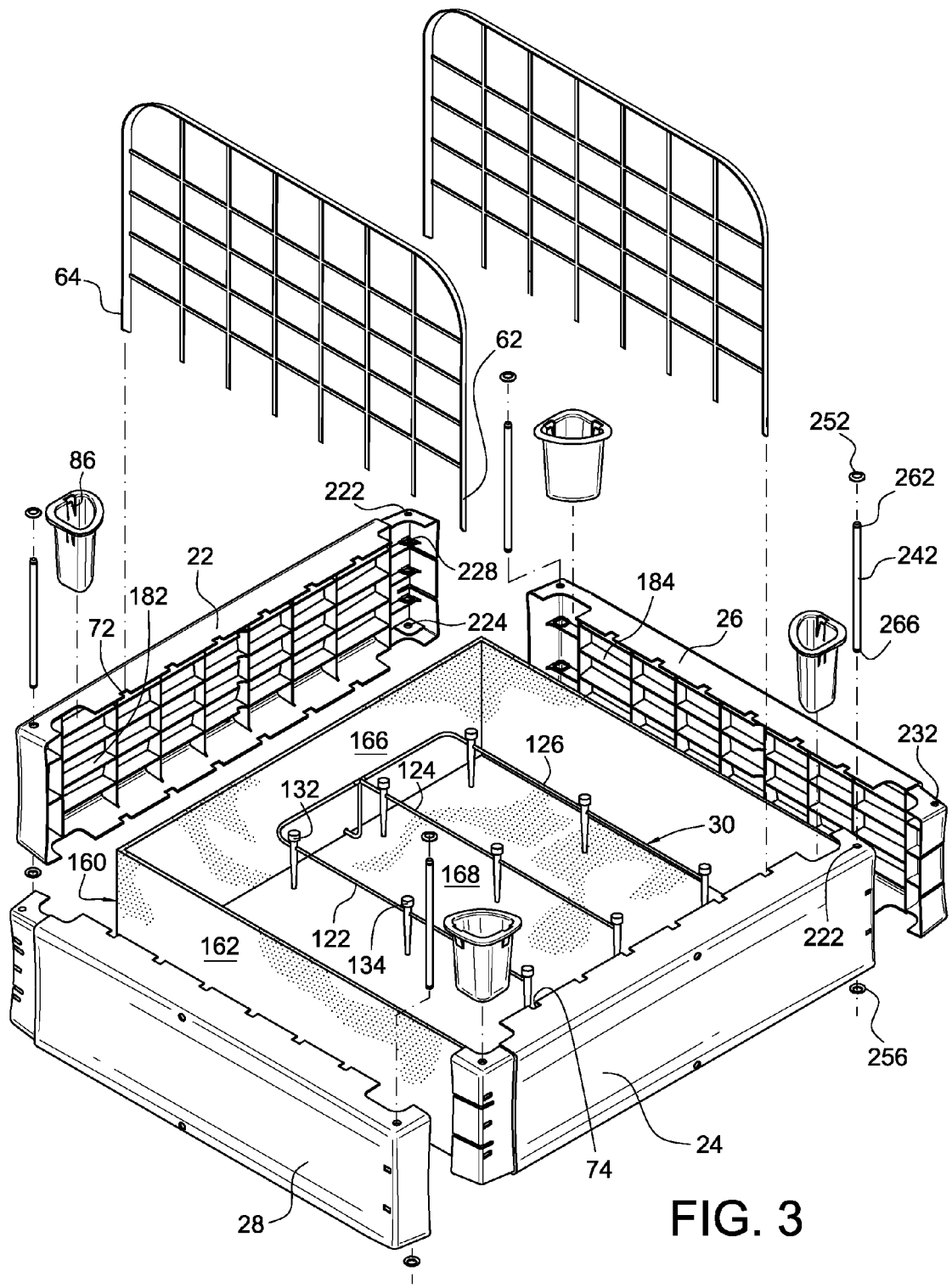
FIG. 3 is an exploded, top rear perspective view of the embodiment of the raised garden bed system of FIG. 1 according to the invention.

Turning to FIGS. 1-4, an embodiment of a garden system 10 in accordance with the invention will now be described, in particular in connection with the assembled gardening system 10 shown in FIGS. 1-3.

Gardening system 10 according to the invention may include a raised bed 20, a sprinkler system 30, and a trellis system 40, as shown.

Trellis system 40 may include a right trellis 42 and a left trellis 44. Right trellis 44 may be provided with cross members 46, and 48, as shown. Likewise, left trellis 44 may include one or more cross members 52 and 56, spaced apart, and substantially horizontal relative to upright extending left trellis 44, depending on the intended use. Further, one or more of the inventive trellises, such as right trellis 42 may include a rear upright 62 and a front upright 64. In order to maintain the desired orientation and securing of trellis 42 relative to raised bed 20, one or more notches, such as the illustrated front notch 72 and rear notch 74 may be provided in front side wall 22 and rear side wall 24, respectively.

In use, right trellis 42 and left trellis 44 may be both used, as shown in FIG. 1, spaced apart, as shown, or placed in adjacent notches, respectively, or only one, or indeed, none need be used, depending on the intended use. As schematically shown, in use, there may be soil S, and in the soil a user, such as a gardener, may form peaks P and valleys V, as schematically shown in broken line, for planting seeds and plants as will be readily understood by a person having ordinary skill in the gardening art.

Further, as shown in FIG. 1, the inventive trellises 42, 44, may be located in raised bed 20 so that only two of the cross members 52 and 56 of left trellis 44 extend above the soil S; likewise, trellis 44 may be provided so that four of cross members 46 and 48, for example, as shown, may be provided and located above the level of soil S, depending on the type of plants which the gardener is growing, as will be readily appreciated.

Figure 4:
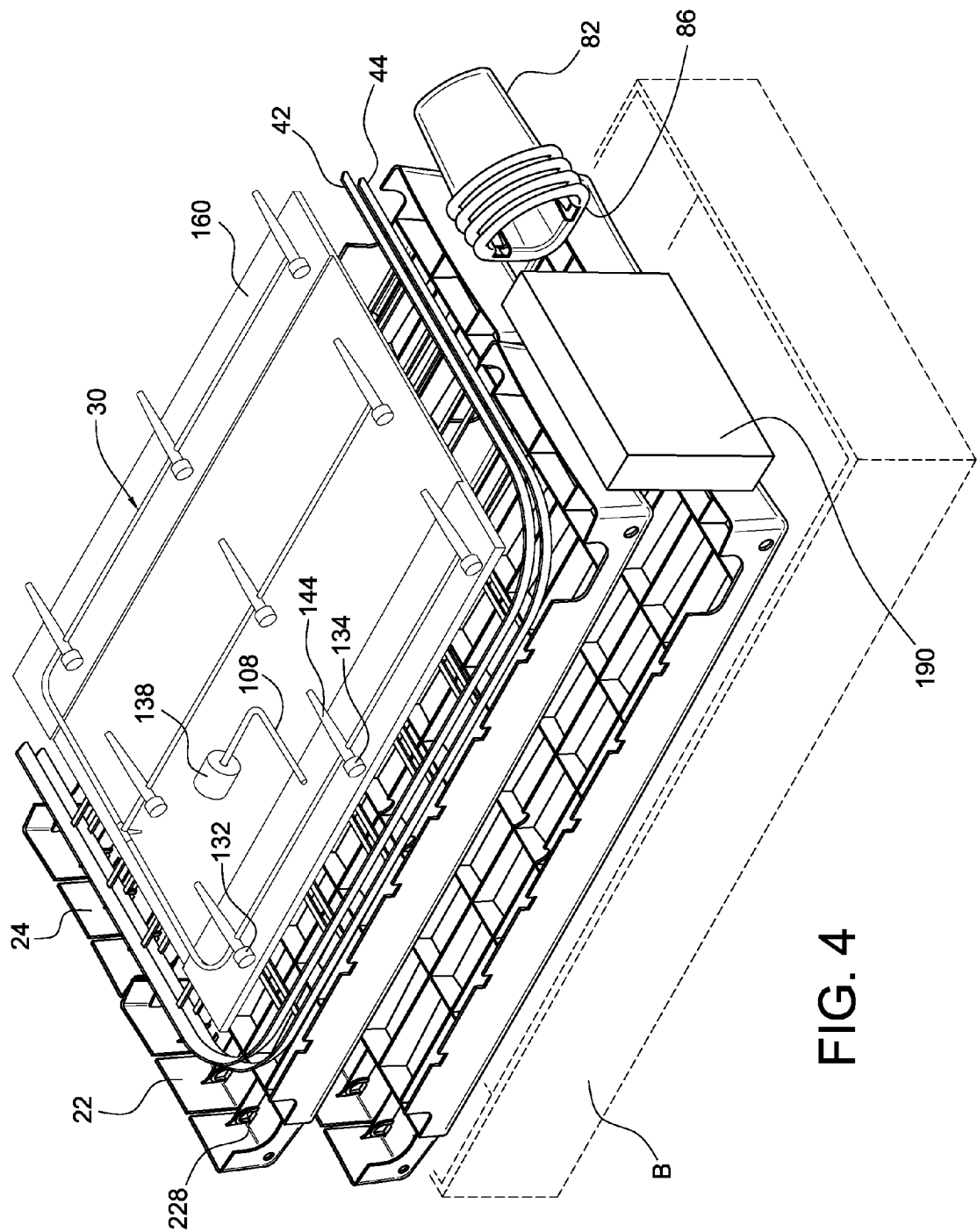
FIG. 4 is a top front perspective view of the embodiment of the raised garden bed system of the embodiment of FIG. 1 according the invention in a disassembled substantially flat position, such as for shipping.

Gardening system 10 may likewise include one or more tool pockets 82, 84, such as shown on the front left and front right of FIG. 1. Each tool pocket 82, 84 may include a snap-fit attachment, such as provided by the illustrated flexible, resilient fastener 86, as best seen in FIG. 1 and FIG. 4, in which fastener 86 is easiest to appreciate. There may be one or two snap-fit fasteners 86, which will engage with an upper edge 92 of an upper wall 92 of rear wall 24, such as shown in FIG. 1, and in section in FIG. 2, as will be readily appreciated. Thanks to the provision of snap-fit fastener 86 engaging with an upper wall 92 of a respective side wall, the tool pockets, such as 82 and 84 may be securely installed by the gardener during assembly without the use of additional fasteners or tools, such as by pressing tool pocket 82 downwardly until fastener 86 has engaged with upper wall 92.

To further enhance the functionality of tool pocket 82, a drain hole 102, such as best seen in FIG. 2, may be provided so that, in use in an outdoor environment, or, indeed, when water may have been applied to the plants growing in raised bed 20, in use, so that water may drain from tool pocket 82 through drain hole 102, thanks to gravity, and there will be little or no water or other liquid buildup in a lower portion of tool pocket 82.

In order to enhance and simplify assembly, each of side walls 22, 24, 26, and 28 according to the invention may be provided with one or more through holes for receiving a water line 108 of sprinkler system 30 therethrough, such as the illustrated lower through hole 118 and upper through hole 122 in front side wall 22 of FIG. 1. Indeed, each of side walls may be provided with such so that the sprinkler system 30 may be connected at an upper or lower portion of raised bed 20, depending on the intended use.

Still further, as to sprinkler system 30, water line 118 may include one or more additional lines 122, 124, and 126, as may be seen in FIG. 3, for example. One or more sprinklers 132 and 134 may be fluidly connected to water lines 122, 124, and 126, as shown. The fluid connection may be achieved in a manner as will be readily apparent to a person having ordinary skill in the art.

In addition, as will be readily understood, a coupling 138 may be provided on water line 108. It is contemplated that coupling 138 be configured for mating with a conventional residential garden hose.

Still further, one or more of sprinklers 132, 134 may be provided with an extension 144. Extension 144 may be provided to assist in stabilizing the positioning and tilting, that is, the orientation of a sprinkler 134 relative to raised bed 20. For example, in use, sprinkler 134 may be oriented so that its water spray is spread substantially horizontally as the water spray falls onto the surface of soil S, as will be readily appreciated. By use of extensions 144, sprinklers 134 may be positioned at different angles, depending on the intended use; and, indeed, when not in use sprinklers 134 may be rotated so that sprinklers 134 and extensions 144 all lie substantially in a plane containing water lines 122, 124, and 126, such as shown in the disassembled state of FIG. 4, so that the inventive gardening system 10 may be shipped, or stored, substantially flat, as shown.

It is contemplated that sprinkler system 10 may include a drip irrigation system without sprinklers 132, 134, for use in different climates and for different crops. In that case, sprinklers 132, 134 would be used with drip lines, or omitted entirely, depending on the intended use.

Still further in accordance with the invention, a weed barrier 160 may be provided, such as best seen in the exploded view of FIG. 3.

Weed barrier 160 may include one or more sides 162 and 166 that are configured for extending upwardly away from a lower substantially horizontal portion 168 of weed barrier 160. Weed barrier 160 may be made of a conventional material which is pervious to water and impervious to plant growth, such as plant stalks and roots, as will be readily understood.

Thanks to the provision of sides 162, 166, in use when soil is provided in assembled raised bed 20 with weed barrier 160 in place, the soil may press sides 162 of the weed barrier into the insets 182, 184 provided in each of side walls 22 and 26 as shown. In that manner, not only are weeds prevented from growing into the soil S retained by raised bed 20, but weed barrier 160 is held securely in place.

In order to assemble the inventive gardening system 10, one may open a box B, such as shown in FIG. 4, and remove the substantially compactly and flatly stored elements of gardening system 10. For example, sprinkler system 30 may be removed and assembled as in the configuration shown in FIG. 3. Weed barrier 160 may likewise be removed and set aside until raised bed 20 has been assembled. Trellises 64 are removed, as well as each of the illustrated side walls 22, 24. Still further, tool pocket 82, for example, may be removed for installation after raised bed 20 has been assembled by securing each of sides 22, 24, 26, and 28 together. Additional components are provided in the unassembled shipping or storage configuration shown in FIG. 4, and are not visible in the drawing. A gardening tool kit 190 may be provided, the contents of which will be determined by the climate and the intended use, for example. Typical tools not visible in FIG. 4 that may be provided in tool kit 190 may include a trowel, fork, weeding tool, and the like, as will be readily understood.

Turning to FIGS. 3 and 4, assembly of gardening system 10 may be readily understood, with reference to the exploded view of FIG. 3 and the assembled perspective view of FIG. 1. After front side 22 and rear side 24 have been freely, detachably engaged with left side 26 and right side 28, the user may detachably attach the four sides together as follows. An upper hole 222 may be provided and spaced apart from a lower hole 224 on rear side 24, for example, as well as at the spaced apart end thereof. Like upper and lower through holes may be provided at each free end. Likewise, upper and lower holes, only upper hole 232 of which may be seen in FIG. 3, may be provided at corresponding locations on the free ends of side wall 26, for example. During assembly, upper hole 232 will be substantially aligned with upper hole 222 of front side 22. Then, a male fastener, such as the illustrated rod 242 may be inserted through the respective four holes which have been aligned; i.e. the three visible holes 222, 232, 224, and the fourth unnumbered hole not visible in FIG. 3. Then, an upper clip 252 and a lower clip 256 may be engaged with respective mating elements 262 and 266 at respective free ends of rod 242.

In that manner, rod 242 may be secured within and hold in place aligned holes 222, 224, and 232, as shown, and as readily understandable, rod 242 will have a vertical length which is substantially the same as the height of a side wall height of sides 24 and 26, for example. In that manner, little, if any of post 242 will extend past a lower portion of raised bed 20, as may be appreciated from considering FIGS. 1 and 2. That is desirable in the case where the gardener wants to place his or her gardening system 10 on a patio, wooden deck, or indeed on the gardener's roof in the case of an urban garden setting. That avoids the problem of the prior art raised bed which included stakes extending past the lower face of the raised bed, and, hence, was unsuitable for use on a patio, deck, or roof, as those prior art stake extensions were intended for engaging with the ground, as the raised bed was intended for use on the lawn in a suburban backyard or in the country. Such extensions engaged the known prior art bed with the soil underneath the gardener's lawn, for example, but was unsuited for use on a roof, as such stakes might make holes in the case of use on a roof; and, such prior art stake extensions led to instability on the patio, instability on the deck, or scratching of the deck.

Still further, it is contemplated that additional through holes may be provided at the corner, such as a through hole 228 inside wall 22 to make an even more secure connection. As shown, additional optional unnumbered through holes may be provided.

Various moldable and extrudable materials may be used for the manufacturing of one or more of the above-described components of the gardening system 10, as will be readily appreciated, and the materials described herein are not intended to be limiting.

While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention.

What is claimed is:

1. A gardening system, comprising:
   a) A raised garden bed, the raised garden bed including:
      i) a garden box, the garden box defining a soil retaining area inside the box, and the garden box including a front, back, left, and right side wall, each side wall having two free ends, each free end having an attachment configured for being detachably attached to an attachment on the adjacent free end of an adjacent one of the respective front, back, left, and right side walls;
      ii) each attachment being configured for being detachably attached to another attachment without tools;
      iii) each free end including a hole configured for aligning with a respective hole on an adjacent free end of an adjacent side wall;
      iv) each side wall including an aperture therein for receiving a waterline therethrough;
      v) a weed barrier being provided, the weed barrier being configured for extending between the front, back, left, and right side walls of the garden box, and the weed barrier being located at a lower portion of the garden box below the soil-retaining area, the weed barrier being substantially pervious to water and impervious to plants, and the weed barrier being secured and configured for extending along the respective front, back, left, and right side walls between the soil retaining area and inside of the respective side walls, the weed barrier including side walls extending substantially as high as the height of the front, back, left, and right side walls;

vi) a sprinkler system provided on the raised garden bed, the sprinkler system including a water line extending through one of the respective apertures provided in each one of the front, back, left, and right side wall;

vii) a coupling provided on the water line, the coupling being configured for connecting to a garden hose;

viii) a plurality of sprinklers provided on the water line, the plurality of sprinklers being spaced apart sufficiently for directing a water spray onto a respective portion of the soil retaining area of the garden box, the plurality of sprinklers collectively directing a collective water spray over substantially the entire soil retaining area;

ix) a tool pocket provided on at least one of the side walls of the garden bed, the tool pocket being detachably attached to the side wall without the use of tools, and the tool pocket including a water drain hole in a lower portion thereof;

x) the attachment on the free end of each side wall including a hole; and xi) at least one rod being provided, each one of the at least one rod being configured for extending through the aligned respective holes aligned at the adjacent free ends of the adjacent side walls, the at least one rod having a length substantially the same as the height of the side walls, and the respective one of the at least one rod being detachably attached and secured in the respective holes without the use of tools for restricting movement of the respective holes and respective side walls for retaining each of the free ends in position for maintaining the raised garden bed in a desired configuration defining the garden box soil retaining area.

2. A gardening system as in claim 1, wherein:
a) the at least one rod includes four rods.

3. A gardening system as in claim 1, wherein:
a) wherein the plurality of sprinklers includes at least six sprinklers.

4. A gardening system as in claim 1, wherein:
a) the plurality of sprinklers includes at least nine sprinklers.

5. A gardening system as in claim 1, wherein:
a) a plurality of spaced apart notches is provided in an upper portion of each of the respective side walls of the garden box, each of the notches in the upper portion is configured for receiving a part of a trellis therein; and
b) at least one trellis is provided and detachably secured in respective spaced opposed notches in the upper portion of the spaced opposed side walls.

6. Use of the gardening system of claim 1 on a hard surface.

7. Use of the gardening system of claim 1 on a roof.

8. Use of the gardening system of claim 1 on a patio.

9. Use of the gardening system of claim 1 on a deck.

* * * * *